US012245338B2

(12) United States Patent
Chen

(10) Patent No.: US 12,245,338 B2
(45) Date of Patent: Mar. 4, 2025

(54) SUPPORT FRAME OF THIN ELECTRIC HEATING BAND

(71) Applicant: Shu-Lien Chen, Taichung (TW)

(72) Inventor: Shu-Lien Chen, Taichung (TW)

( * ) Notice: Subject to any disclaimer, the term of this patent is extended or adjusted under 35 U.S.C. 154(b) by 707 days.

(21) Appl. No.: 17/516,709

(22) Filed: Nov. 2, 2021

(65) Prior Publication Data

US 2022/0201800 A1 Jun. 23, 2022

(30) Foreign Application Priority Data

Dec. 18, 2020 (TW) ................................ 109145201

(51) Int. Cl.
*H05B 1/02* (2006.01)
*A45D 20/10* (2006.01)
*H05B 3/28* (2006.01)

(52) U.S. Cl.
CPC ........... *H05B 1/0252* (2013.01); *A45D 20/10* (2013.01); *H05B 3/283* (2013.01)

(58) Field of Classification Search
CPC ...... A45D 20/10; A45D 20/12; H05B 1/0252; H05B 3/16; H05B 3/283; H05B 3/565
USPC ................. 219/520, 521, 532–537, 540, 542
See application file for complete search history.

(56) References Cited

U.S. PATENT DOCUMENTS

| | | | | |
|---|---|---|---|---|
| 4,628,189 A * | 12/1986 | Danko | H05B 3/32 219/532 |
| 6,259,070 B1 * | 7/2001 | Audet | D06F 58/26 219/532 |
| 2005/0194327 A1 * | 9/2005 | Chen | H05B 3/16 211/13.1 |
| 2017/0164709 A1 * | 6/2017 | Laveni | A45D 20/10 |

* cited by examiner

*Primary Examiner* — Sang Y Paik

(57) ABSTRACT

A support frame of a thin electric heating band contains: a body, multiple first blades, multiple second blades, multiple fixing sheets, and multiple defining elements. The body includes a base and multiple supporting arms. Each first blade includes multiple first spaced recesses, and each second blade includes multiple second spaced recesses, such that the thin electric heating band is engaged in each first spaced recess and each second spaced recess, thus positioning the thin electric heating band. Each fixing sheet is stacked on each first blade and includes multiple spaced notches, and each spaced notch communicates with each first spaced recess laterally. Each first blade includes an air facing fringe and an air shadow fringe, and each defining element is fixed on the air shadow fringe of each first blade.

4 Claims, 4 Drawing Sheets

SUPPORT FRAME OF THIN ELECTRIC HEATING BAND

FIELD OF THE INVENTION

The present invention relates to a hot air generator, and more particularly to a support frame of a thin electric heating band.

BACKGROUND OF THE INVENTION

A conventional hot air generating devices such as hair dryers and dryers are comprised of a blower, an air duct, and an electric heating structure. The blower operates to form an air flow, and the air duct guides the air flow through the electric heating structure. The electric heating structure is configured to release heat energy to the air flow, thereby producing hot air.

The electric heating structure contains a support frame and two thin electric heating sheets, wherein the support frame is comprised of a base and multiple blades, and the base includes multiple supporting arms radially extending therefrom. Each blade is elongated, made of Mica, and fixed on each supporting arm. In addition, each blade includes multiple spaced recesses defined on each of two sides thereof. Each electric heating sheet is elongated and is made of high-impedance material, wherein each electric heating sheet is arranged on each of two sides of each blade and is engaged in each spaced recess from the inside out in a spider web shape, thus positioning each electric heating sheet.

Electric current passes through each electric heating sheet so that the electric heating sheet converts electrical energy into heat energy by using the material resistance, thus producing heat. When the air flow moves through the electric heating structure along the body, it flows through the electric heating sheet to exchange the heat with air surrounding the electric heating sheet, and the temperature of the airflow rises to form hot air.

When the electric heating sheet heats up to produce thermal expansion, a length of the electric heating sheet increases, and the air flow moves through the electric heating sheet along the tangential direction of the width surface of the electric heating sheet, thus forming a wind shear phenomenon. Therefore, it is easy to cause the electric heating sheet to vibrate, so that the electric heating sheet on the air shadow side forms a cutting effect on the bottom part of the blade in the spaced recess. To support the blade, the supporting arm is made of steel or other metal materials. However, when the electric heating sheet cuts the blade excessively and contacts the supporting arm, a short circuit happens.

Furthermore, the length of the electric heating sheet located on the air shadow side will increase, and the electric heating sheet is pulled by the air flow to move away from the spaced recess, thus having poor positioning reliability.

The present invention has arisen to mitigate and/or obviate the afore-described disadvantages.

SUMMARY OF THE INVENTION

The primary objective of the present invention is to provide a support frame of a thin electric heating band which contains multiple fixing sheets made of rigid insulation material and stacked on multiple first blade to avoid multiple first blades of the electric heating band contacting the supporting arm of the body, thus enhancing a positioning reliability of the electric heating band.

Another objective of the present invention is to provide a support frame of a thin electric heating band which contains multiple defining elements so that when the electric heating band is pulled by the air flow to move, the electric heating band does not move away from each first blade and each fixing sheet, thus enhancing the positioning reliability of the electric heating band.

To obtain above-mentioned objectives, a support frame of a thin electric heating band provided by the present invention contains: a body, multiple first blades, multiple second blades, multiple fixing sheets, and multiple defining elements.

The body includes a base, multiple supporting arms radially extending from the base. The multiple first blades and the multiple second blades are elongated, made of insulation materials, and intersected. Each first blade and each second blade are positioned on each supporting arm, and each first blade is proximate to any two adjacent second blades. Each first blade includes multiple first spaced recesses defined on each of two sides thereof, and each second blade includes multiple second spaced recesses formed on each of two sides thereof, such that the thin electric heating band is engaged in each first spaced recess and each second spaced recess, thus positioning the thin electric heating band.

Each fixing sheet is made of rigid insulation material and is elongated, and each fixing sheet is stacked on each first blade and includes multiple spaced notches defined on each of two sides of each fixing sheet. Each spaced notch communicates with each first spaced recess laterally so that the electric heating band is engaged in each spaced notch to avoid producing a cutting effect to the each first blade, thus enhancing a positioning reliability of the electric heating band.

Each first blade includes an air facing fringe defined on a first side thereof, and each first blade includes an air shadow fringe defined on a second side thereof. Each defining element is fixed on the air shadow fringe of each first blade, and each defining element is made of rigid insulation material and is in a wire shape. A first end of each defining element is connected with a first end of each first blade away from the base, a second end of each defining element is connected with the air shadow fringe of each first blade, and each defining element is close to each fixing sheet, such that the electric heating band is stopped by each first spaced recess and each second spaced notch, thus enhancing the positioning reliability of the electric heating band.

Thereby, when an air flow moves to the electric heating band along the body and faces to the air shadow fringe of each first blade, each fixing sheet supports the electric heating band so that vibration of the electric heating band does not produce a cutting effect to each first blade and each fixing sheet, and the electric heating band supports any two adjacent first blades to reduce the cutting effect of the electric heating band to any two adjacent second blades, hence the electric heating band does not contact each supporting arm to enhance the positioning reliability of the electric heating band and to avoid short circuit of the electric heating band.

DETAILED DESCRIPTION OF THE PREFERRED EMBODIMENTS

Figure 1:
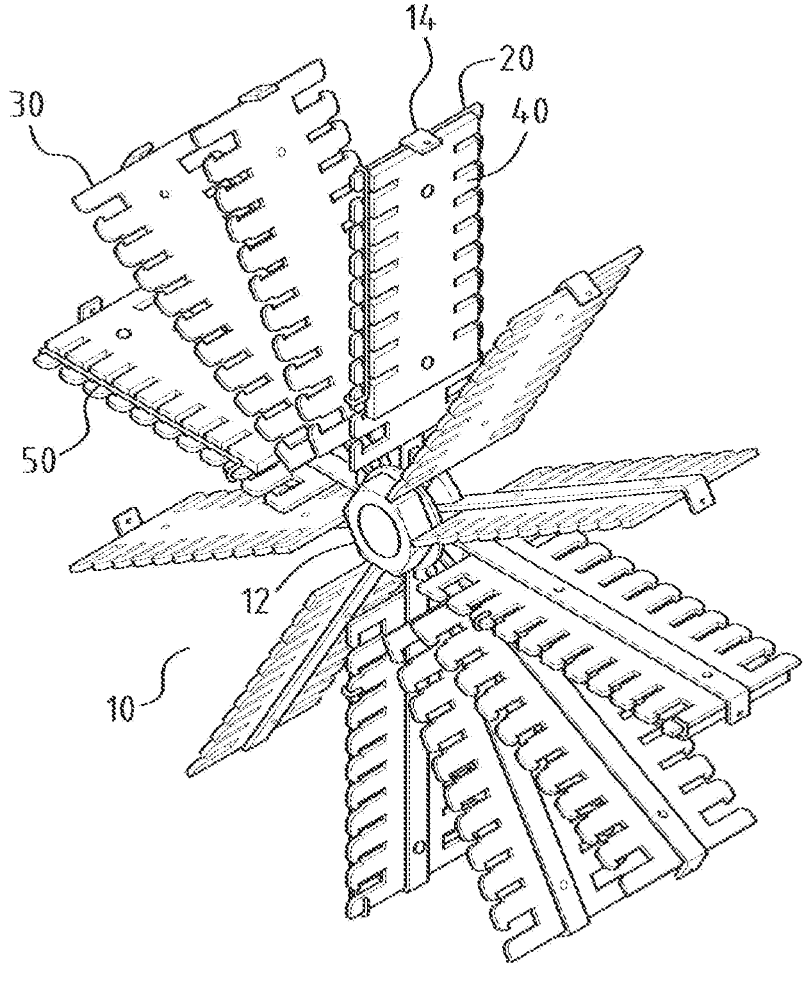
FIG. 1 is a perspective view showing the assembly of a support frame of a thin electric heating band according to a first embodiment of the present invention.
Figure 2:
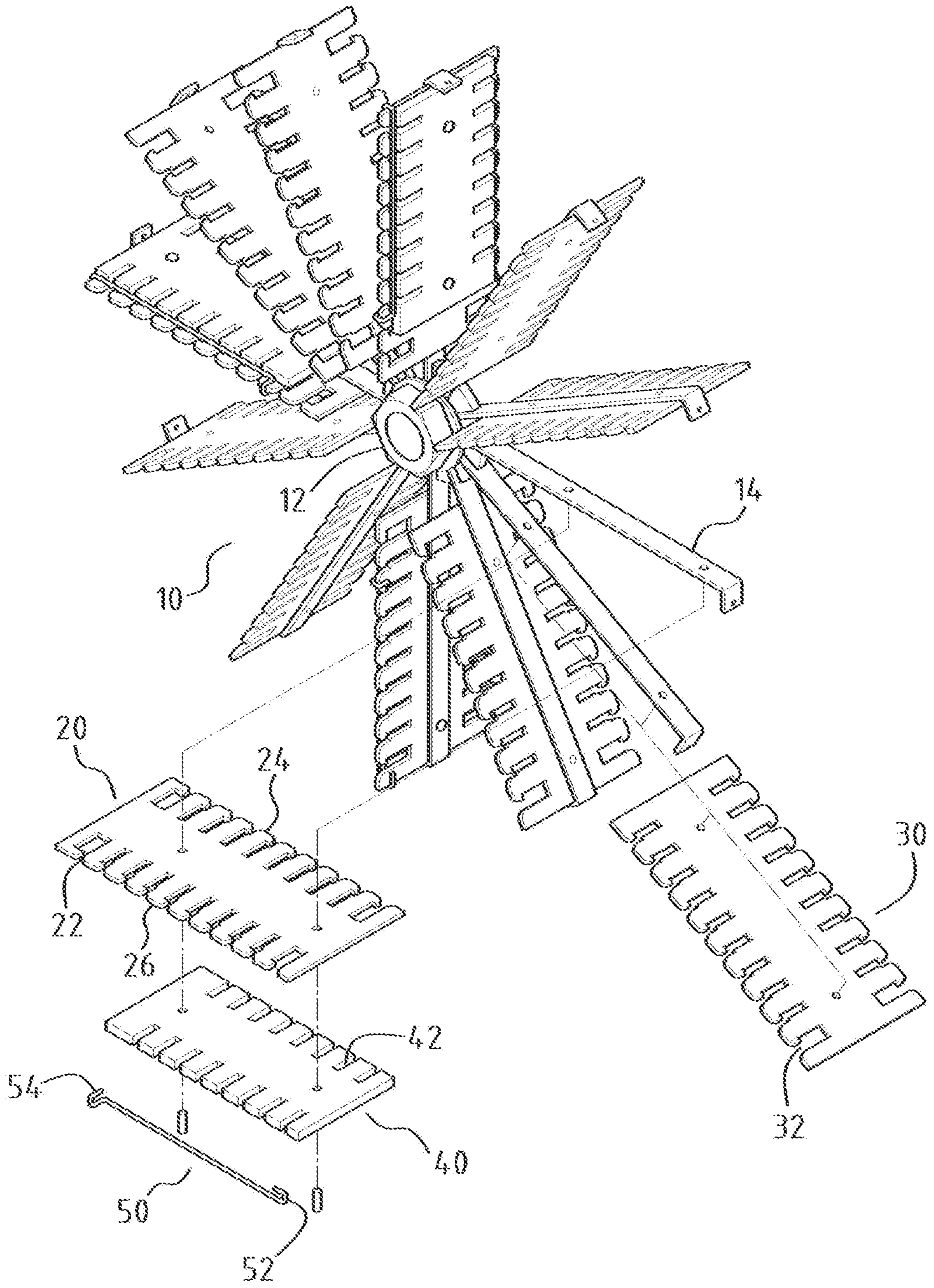
FIG. 2 is a perspective view showing the exploded components of a part of the support frame of the thin electric heating band according to the first embodiment of the present invention.
Figure 3:
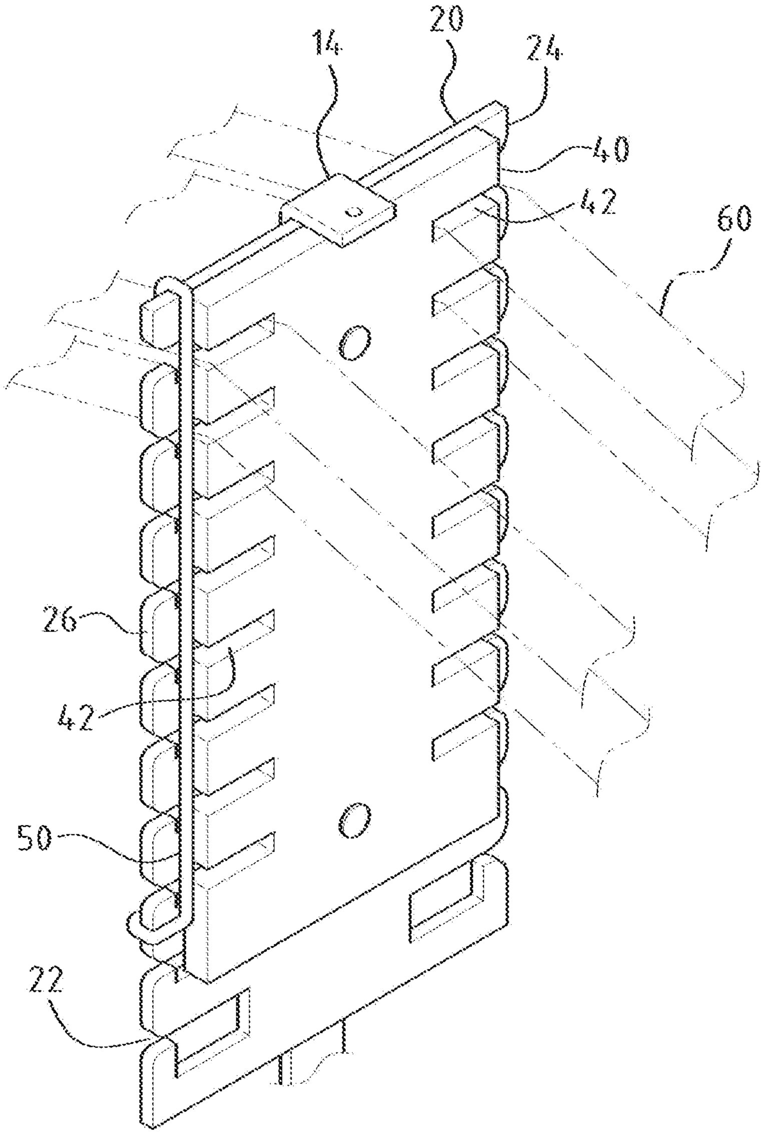
FIG. 3 is a perspective view showing the assembly of a part of the support frame of the thin electric heating band according to the first embodiment of the present invention.

With reference to FIGS. 1-3, a support frame of a thin electric heating band 60 according to a first embodiment of the present invention comprises: a body 10, multiple first blades 20, multiple second blades 30, four fixing sheets 40, and four defining elements 50. In this embodiment, four first blades 20 and eight second blades 30 are provided.

The body 10 includes a base 12, multiple supporting arms 14 radially extending from the base 12. The four first blades 20 and the eight second blades 20 are elongated and made of insulation materials (such as Mica), wherein the four first blades 20 and the eight second blades 20 are intersected, each first blade 20 and each second blade 30 are positioned on each supporting arm 14, and each first blade 20 is proximate to any two adjacent second blades 30. Each first blade 20 includes multiple first spaced recesses 22 defined on each of two sides thereof, and each second blade 30 includes multiple second spaced recesses 32 formed on each of two sides thereof. The thin electric heating band 60 is engaged in each first spaced recess 22 and each second spaced recess 32 from the inside out in a spider web shape, thus positioning the thin electric heating band 60.

In the first embodiment, the four first blades 20 are arranged on the body 10 evenly, and any two adjacent second blades 30 are defined between any two adjacent first blades 20, wherein a number of the multiple first blades 20 and the multiple second blades 30 is increased or decreased based on using requirements.

The four fixing sheets 40 are made of rigid insulation material and are elongated, wherein the insulation material is any one of Bakelite, ceramics, and other materials. Each fixing sheet 40 is stacked on each first blade 20 and includes multiple spaced notches 42 defined on each of two sides of each fixing sheet 40, wherein each spaced notch 42 communicates with each first spaced recess 22 laterally so that the electric heating band 60 is engaged in each spaced notch 42 to avoid producing a cutting effect to the each first blade 20, thus enhancing a positioning reliability of the electric heating band 60.

Each first blade 20 includes an air facing fringe 24 defined on a first side thereof, and each first blade 20 includes an air shadow fringe 26 defined on a second side thereof, wherein each defining element 50 is fixed on the air shadow fringe 26 of each first blade 20, each defining element 50 is made of rigid insulation material and is in a wire shape, and the rigid insulation material of each defining element 50 is any one of Bakelite, ceramics, and other materials so that each defining element 50 obtains heat-resistant insulation. A first end of each defining element 50 is connected with a first end of each first blade 20 away from the base 12, a second end of each defining element 50 is connected with the air shadow fringe 26 of each first blade 20, and each defining element 50 is close to each fixing sheet 40, such that the electric heating band 60 is stopped by each first spaced recess 22 and each second spaced notch 42, thus enhancing the positioning reliability of the electric heating band 60.

When an air flow moves to the electric heating band 60 along the body 10 and faces to the air shadow fringe 26 of each first blade 20, each fixing sheet 40 supports the electric heating band 60 so that vibration of the electric heating band 60 does not produce a cutting effect to each first blade 20 and each fixing sheet 40, and the electric heating band 60 supports any two adjacent first blades 20 to reduce the cutting effect of the electric heating band 60 to any two adjacent second blades 30, hence the electric heating band 60 does not contact each supporting arm 14 to enhance the positioning reliability of the electric heating band 60 and to avoid short circuit of the electric heating band 60.

Each defining element 50 is configured to stop a part of the electric heating band 60 located on the air shadow fringe 26 of each first blade 20 so that when the electric heating band 60 is pulled by the air flow to move to each first spaced recess 22 and each second spaced recess 42, the electric heating band 60 does not move away from each first spaced recess 22 and each second spaced recess 42, and the electric heating band 60 does not detach from each first blade 20 and each fixing sheet 40, thus enhancing the positioning reliability of the electric heating band 60.

Furthermore, each defining element 50 includes a first hooking portion 52 formed on a first end thereof, and each defining element 50 includes a second hooking portion 54 formed on a second end thereof, wherein the first hooking portion 52 hooks with the first end of each first blade 20 away from the base 12, and the second hooking portion 54 hooks with the air shadow fringe 26 of each first blade 20, thus positioning each defining element 50.

Figure 4:
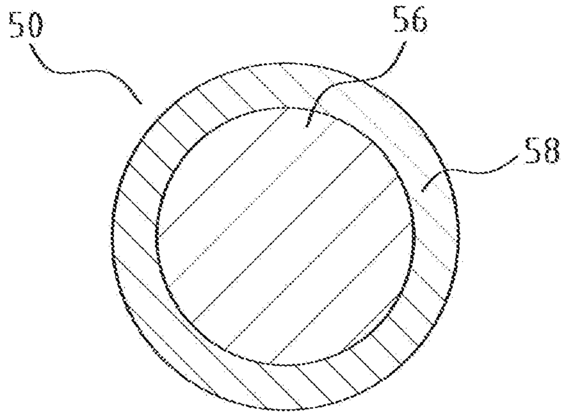
FIG. 4 is a cross sectional view showing the assembly of a part of the support frame of the thin electric heating band according to a second embodiment of the present invention.

With reference to FIG. 4, a support frame of a thin electric heating band 60 of a second embodiment different from that of the first embodiment comprises: each defining element 50 including a wire core 56 made of metal, and each defining element 50 also including a protective sleeve 58 configured to cover the wire core 56 and to provide heat-resistant insulation to the wire core 56, wherein the protective sleeve 58 is made of Bakelite or ceramics.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A support frame of a thin electric heating band comprising: a body, multiple first blades, multiple second blades, multiple fixing sheets, and multiple defining elements;

wherein the body includes a base, multiple supporting arms radially extending from the base, the multiple first blades and the multiple second blades are elongated, made of insulation materials, and intersected, wherein each first blade and each second blade are positioned on each supporting atm, and each first blade is proximate to any two adjacent second blades, wherein each first blade includes multiple first spaced recesses defined on each of two sides thereof, and each second blade includes multiple second spaced recesses formed on each of two sides thereof, such that the thin electric heating band is engaged in each first spaced recess and each second spaced recess, thus positioning the thin electric heating band;

wherein each fixing sheet is made of rigid insulation material and is elongated, and each fixing sheet is stacked on each first blade and includes multiple spaced notches defined on each of two sides of each fixing sheet, wherein each spaced notch communicates with each first spaced recess laterally so that the electric heating band is engaged in each spaced notch to avoid producing a cutting effect to the each first blade, thus enhancing a positioning reliability of the electric heating band;

wherein each first blade includes an air facing fringe defined on a first side thereof, and each first blade includes an air shadow fringe defined on a second side thereof, wherein each defining element is fixed on the air shadow fringe of each first blade, each defining element is made of rigid insulation material and is in a wire shape, wherein a first end of each defining element is connected with a first end of each first blade away from the base, a second end of each defining element is connected with the air shadow fringe of each first blade, and each defining element is close to each fixing sheet, such that the electric heating band is stopped by each first spaced recess and each second spaced notch, thus enhancing the positioning reliability of the electric heating band.

2. The support frame of the thin electric heating band as claimed in claim 1, wherein each defining element includes a first hooking portion formed on a first end thereof, and each defining element includes a second hooking portion formed on a second end thereof, wherein the first hooking portion hooks with the first end of each first blade away from the base, and the second hooking portion hooks with the air shadow fringe of each first blade, thus positioning each defining element.

3. The support frame of the thin electric heating band as claimed in claim 1, wherein each fixing sheet and each defining element are made of ceramics.

4. The support frame of the thin electric heating band as claimed in claim 1, wherein each defining element includes a wire core made of metal, and each defining element also includes a protective sleeve configured to cover the wire core and to provide heat-resistant insulation to the wire core.

* * * * *